United States Patent [19]
Berger et al.

[11] Patent Number: 5,608,890
[45] Date of Patent: *Mar. 4, 1997

[54] DATA SET LEVEL CACHE OPTIMIZATION

[75] Inventors: Jeffrey A. Berger, San Jose; Stanley C. Kurtz, Watsonville, both of Calif.

[73] Assignee: International Business Machines Corporation, Armonk, N.Y.

[*] Notice: The term of this patent shall not extend beyond the expiration date of Pat. No. 5,499,354.

[21] Appl. No.: 417,631

[22] Filed: Apr. 6, 1995

Related U.S. Application Data

[63] Continuation of Ser. No. 908,698, Jul. 2, 1992, abandoned.

[51] Int. Cl.⁶ .............................. G06F 12/08; G06F 12/00
[52] U.S. Cl. ........................ 395/440; 395/463; 395/465
[58] Field of Search ................................. 395/440, 463, 395/465

[56] References Cited

U.S. PATENT DOCUMENTS

| | | | |
|---|---|---|---|
| 4,463,424 | 7/1984 | Mattson et al. | 395/463 |
| 4,500,954 | 2/1985 | Duke et al. | 395/465 |
| 4,603,380 | 7/1986 | Easton et al. | 395/440 |
| 4,603,382 | 7/1986 | Cole et al. | 395/250 |
| 4,916,605 | 4/1990 | Beardsley et al. | 395/489 |
| 5,131,087 | 7/1992 | Warr | 395/440 |
| 5,283,884 | 2/1994 | Menon et al. | 395/440 |

OTHER PUBLICATIONS

Davarakonda et al, "multi–Section Method for Data Cache Management", 12 IBM TDB pp. 357–359, May 1991.

*Primary Examiner*—Eddie P. Chan
*Assistant Examiner*—R. G. Bragdon
*Attorney, Agent, or Firm*—R. Bruce Brodie; Paik Saber

[57] ABSTRACT

A method and means for dynamically managing access by data sets to an LRU disciplined DASD cache staging data sets. A threshold utilizes the inverse of slowly varying global hit ratios (ST) taken over a large number of data sets to control the access by individual data sets in cache as measured by their local hit ratios (DSHR). After an initial trial period, a data set is allowed access to the cache only where DSHR>ST. The method and means are self adjusting in that as I/O demand changes, ST also changes in phase such that an increase in aggregate demand for cache results in elimination of data sets whose DSHRs were marginally equal to the old ST and now less than the new ST. Utilization of a DASD Fast Write and non-volatile store (NVS) can be managed similarly if coordinated with the cache and maintenance of both a global WRITE threshold (WR), local data set write hit ratio (DSHRW), and invocation of Fast Write only where DSHRW>WT (write threshold).

8 Claims, 4 Drawing Sheets

FLOW OF CONTROL OF CACHE STATES

DYNAMIC CACHE MANAGEMENT AND FAST WRITE USING NVS BACKING

FLOW OF CONTROL OF CACHE STATES

STATE TO STATE TRANSITIONS

DATA SET LEVEL CACHE OPTIMIZATION

This is a continuation of the application Ser. No. 07/908,698, filed Jul. 2, 1992, now abandoned.

FIELD OF THE INVENTION

This invention relates to computer storage of information, and more particularly, to dynamic management of least recently used (LRU) disciplined cache storage for optimizing cache performance, enhancing selectivity among cacheable units of data, using stable and economically obtained statistics of cache accessing behavior.

DESCRIPTION OF RELATED ART

Some Cache Basics

A cache is a special purpose high speed buffer interposed between a processor and a larger but slower speed memory or storage. If data is stored in the cache, then it can be accessed (termed a "hit") in a shorter amount of time by applications executing on the processor than if it were stored in the larger but slower memory. If data is not in the cache when referenced (termed a "miss"), then access must be made to the slower backing memory or storage.

The advantage of cache arises from the tendency of applications to make repeated references to the same data. This clustering of data is termed "locality of referencing". Performance measures include the ratio of the number of hits or misses to the total number of input/output (I/O) references. These are denominated the "hit ratio" or "miss ratio" respectively. Up through the 1970's, hit and miss ratios were only determined from reference traces, which limited their utility to static tuning of storage.

Caches and Replacement Discipline

Today, caches are everywhere. Processors employ separate data and instruction caches between the logical portion of the processor and main memory. Also, caches and related structures (non-volatile store) are interposed in the path to data residing in external storage subsystems of direct access storage devices (DASDs) and the like. Because caches are finite and expensive resources, they are shared among concurrent processes or executing applications.

As might be expected, a DASD cache quickly fills up. This poses the problem of determining which data elements in cache must be destaged or eliminated so as to ensure sufficient space for the most recent "miss" i.e. the most referenced data element not located in cache but to be added thereto.

The prior art is replete with methods for replacement such as "least recently used" (LRU) in which the data element to be destaged or eliminated is the one which has not been referenced over the longest period of time. Indeed, this is termed LRU ordering of cache contents.

Dynamic Management of LRU Disciplined Cache

Conventional dynamic management of LRU DASD cache inventions are exemplified by the Mattson, Davarakonda, and Smith references.

Mattson et al, U.S. Pat. No. 4,463,424, "Method for Dynamically Allocating LRU/MRU Managed Memory Among Concurrent Sequential Processes", issued Jan. 31, 1984, teaches the dynamic determination of hit ratios from I/O reference traces for a concurrently accessed demand paging virtual storage system. Mattson also teaches that such ratios can be used to form and maintain an LRU ordering of pages and for varying the number of cache addresses assigned to each of several concurrent processes as a function of said ratio.

Davarakonda et al, "Multi-Section Method for Data Cache Management", 12 IBM TDB 357–359, May 1991 assigns distinct portions of a cache queue as an aging function of the data. That is, each data object resident in cache is assigned a retention code and position as some function of its hit ratio. Destaging is not a function of absolute ordering but of retention code.

Copending application by Smith, U.S. Ser. No. 07/332,870, "A Method for Managing An LRU Prioritized Cache", filed Apr. 3, 1989 and abandoned on Nov. 16, 1992, discloses and claims a method predicated upon the observation that if the signed difference between an assigned and actual hit/miss ratio were to be used to dynamically allocate cache size to a class of data and correlate that assignment with priority of that class, then the actual cache hit/miss ratio could be maximized and priority among data sets preserved.

Selecting Data Elements To Be Cached When Initially Accessed As to Complement LRU Cache Replacement As mentioned above, cached DASD storage subsystems use a cache replacement strategy to decide which cache data elements to demote out of the cache when space is needed for newly referenced elements. The objective is to maximize the effective use of cache by trying to keep those elements in cache that will most likely be referenced next. This is the genesis for some type of LRU or equivalent replacement discipline.

Experience has shown that even with an effective replacement discipline, a DASD cache is still subject to excessive demand. This results in excessive movement of data elements into and out of the cache with a consequent impact on DASD subsystem performance. One way to avoid this result is through limiting the use of the cache by inhibiting some data from entering it.

Current architecture such as that expressed in the IBM 3990 Storage Control Unit and exploited by MVS/DFP 3.2 operating system allows the central processor to tell the DASD subsystem whether to inhibit the use of cache for a given request. Thus, the processor has the ability to automatically select which data elements should enter the cache and which should not. One prior art system, Legent Corporation's AZTEX™ cache manager adverts to this in their User Guide (Document No: AS-CXS21-1 published late 1990 or in 1991. This is based on the system monitoring and inhibiting cache usage on a cacheable unit basis, such as a DASD track of data. Such function requires considerable storage and the development of a history for each cacheable/stageable unit. Thus, some data elements would never be cached, other elements always cached, while other data elements would be classified permissively, i.e. they may be cached. The operating system then decides when to inhibit this third class of data. The choice of which data to inhibit might be arbitrary, as with MVS/DFP 3.2, or it might be based upon some criterion employed by the operating system.

Cache, Fast Write, and The Non-volatile Store

Beardsley et al, U.S. Pat. No. 4,916,605, "Fast Write Operations", issued Apr. 10, 1990 discloses fast write operations in which a DASD subsystem concurrently stores time stamped data from a host in a cache and a non-volatile store (NVS) and sends a completion signal to the host. The subsystem then asynchronously destages the blocks to DASD from the cache and on a batched postings basis to a log from the NVS, the latter being for use in recovery.

The co-pending Courtney et al application, U.S. Ser. No. 07/878,810, filed May 5, 1992, issued on May 23, 1995 as U.S. Pat. No. 5,418,921 also discloses and claims a method and means for the fast writing of blocks in a storage subsystem. However, the storage subsystem includes an array of selectably accessible DASDs, a cache and non-volatile store (NVS) coupling said array, and means responsive to read, write, and write update references from at least one external source for staging and destaging logical tracks of block organized data or portions thereof between the cache or NVS and selectable ones of the DASDs. In Courtney, a cache miss requires the destaging from cache of at least a newly written block or an updated block.

SUMMARY OF THE INVENTION

It is an object of this invention to devise a method and means for dynamically optimizing LRU disciplined cache performance over those cacheable units of data exhibiting homogeneous locality of referencing. By homogeneous it is meant that the hit ratio to data stored on any given storage extent such as a sector or track approximates the hit ratio to data stored on any other storage extent forming the cacheable unit of data.

It is a related object to devise a dynamically actuable cache management method and means which utilize self-tuning, enhance selectivity among the cacheable units of data, and predict referencing behavior through low cost and stable I/O statistics.

It is yet another object that the referencing behavior and the I/O statistics be continuously evaluated and that separate criteria exist for read and write operations.

It is a still further object that said method and means enable as many cacheable units of data to benefit from processing through the cache, that said cacheable units be differentiated according to their caching behavior, that the cacheable units of data most likely to be re-referenced be retained in said cache, and that the method and means be operable with a DASD FAST WRITE function.

It was unexpectedly observed that the DATA SET is the cacheable unit of data most likely to exhibit homogeneous locality of reference. This results from the fact that the data set generally is of a size sufficient to form a large enough sample to support reliable and stable I/O referencing statistics. For purposes of this invention, a data set is defined to be an addressable and logical association of records, files, or blocks typically spanning more than a single DASD track at the low end and one or more volumes at the high end. It stands in contrast to the DASD track as a cacheable unit of data.

Whether or not a data set should be retained in cache requires information both about the data set (hit ratio) and the state of storage control (subsystem thresholds). This invention uses a metric termed a "data set hit ratio" (DSHR) indicative as to whether caching is beneficial to the data set. In the realization of this invention, two hit ratios actually are determined—one for all I/O's for the data set (DSHR) and one representing writes specifically (DSHRW). A second metric termed a "subsystem threshold" (ST) is also invoked. ST is a measure of the overall referencing load on the subsystem.

Operationally, DSHRs are compared with the ST such that for maximum benefit, ST is automatically adjusted to lie within an appropriate value range. This ensures that data sets with very low DSHR's are excluded from the cache. To maintain currency, ST varies directly as the subsystem load and is periodically adjusted.

Elementally, the inventive method employs the rule that for any given data set if data sets DSHR>ST, then the data set is cached or maintained in cache. Whenever data sets DSHR<ST, the data set is inhibited from entering the cache. As the subsystem load increases, the ST will usually increase, this reduces the number of data sets enabled for the cache. This is consequence of the rule that a data set be retained in cache only until its DSHR falls below ST. The decision to exclude or disable data sets whose DSHR<ST is based on the statistical observation that such data sets would normally experience worse performance if allowed access to the cache, and, would impair the cache performance of other data sets as by way of unproductive staging.

More particularly, the objects recited above are satisfied by a method and means for self tuning a LRU cache in the data path between a storage subsystem and a processor I/O referencing cacheable units of data stored in said subsystem.

The method and means comprise several elements. First, a storage subsystem threshold value (ST) is ascertained as a function of the processor generated I/O references over all cacheable units of data. Next, responsive to an initial processor reference to each set of cacheable units, the set of data is allowed use of cache over M I/O references and its hit ratio (DSHR) is determined. After this, the DSHR of the set of data is periodically determined with the result of allowing use of cache so long as its DSHR>ST. Lastly, upon the condition that the DSHR<ST of a set of data, all cache references to said set of data over N I/O operations are inhibited after which said data set becomes eligible for caching. Note that $|M|<<|N|$.

Advantageously, the likelihood of those data sets most in demand being cached is increased as is the likelihood of excluding from cache those data sets least in demand. This fundamentally differentiates among data sets according to their caching behavior. Also, the step or means involving selective enablement or disablement of data sets for the cache ensures that only a few data sets have their status changed at any time. This avoids "thrashing". The latter for purposes of this invention is defined as the condition where data sets are repeatedly enabled and then disabled resulting in unnecessary data movements into and out of cache.

Another advantage of the method and means of this invention resides in its self tuning or adjusting characteristics. That is, as the number of I/O references increases over all data sets, the hit ratios decrease because the increased statistical spread. This causes an increase in the value of the threshold ST. In turn, data sets having DSHR's approximating the old value of ST but now less than the new value of ST will be inhibited from the cache. Likewise, for any drop in I/O references over all data sets, the hit ratios increase and the threshold ST decreases, thereby retaining in cache data sets having marginal DSHR's.

Yet another advantage resides in the improvement in utilization of NVS when coordinately managed with DASD cache. This relies upon associating a write hit ratio (DSHRW) with each data set and a subsystem write threshold (WT) and invoking Fast Write for each Write I/O for a data set where DSHRW>WT. Furthermore, when Fast Write is operative, the DSHR is based upon both READ and WRITE accesses. It has been found that optimality in managing cache and NVS can be achieved where data sets are competing by considering WRITE accesses as well as READ accesses when evaluating caching behavior. Parenthetically, in this specification WRITE access, WRITE reference or the like are used as synonyms. The same applies to READ access, READ reference, or the like.

DESCRIPTION OF THE PREFERRED EMBODIMENT

Physical Storage Environment for Practicing the Invention

Figure 1:
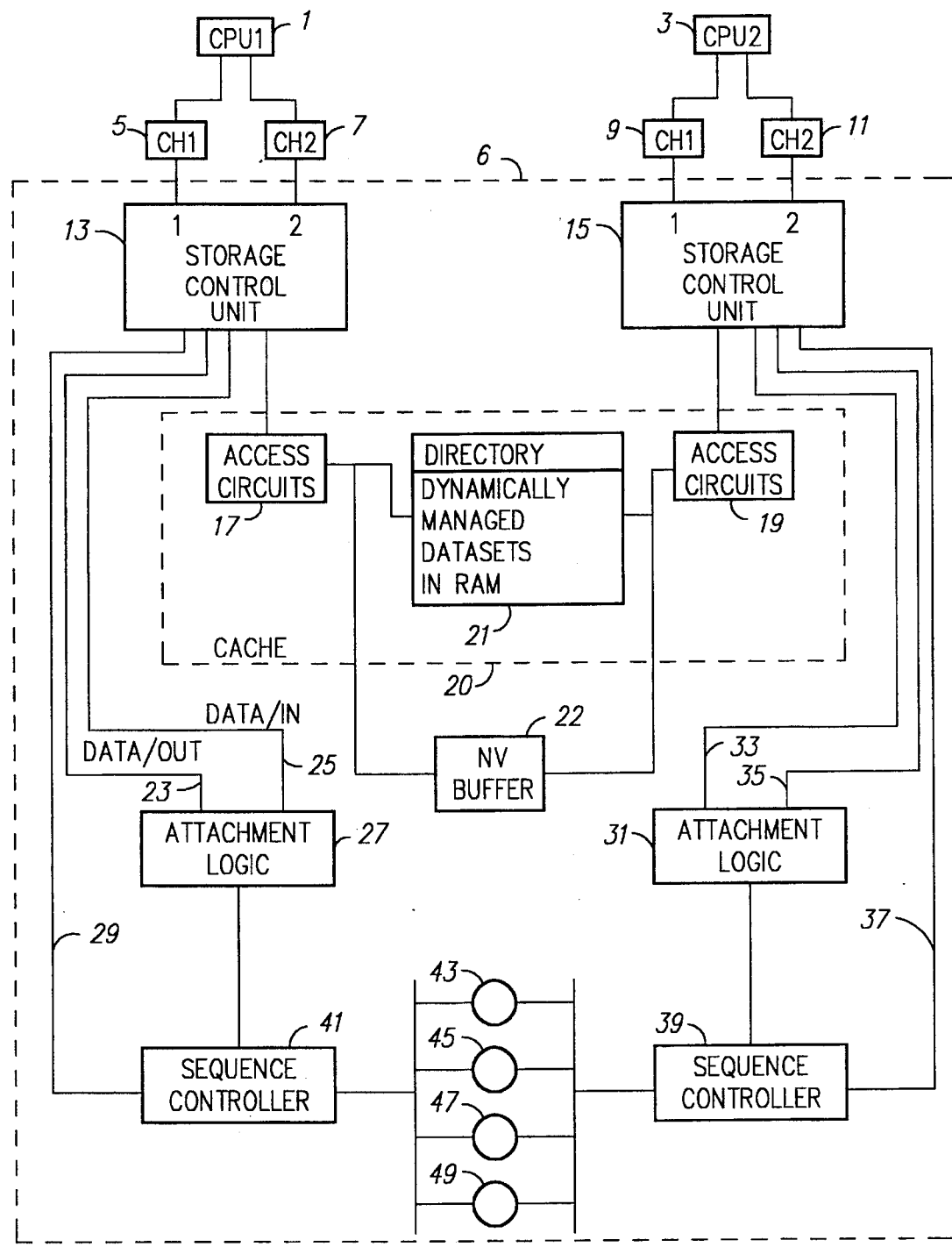
FIG. 1 shows a prior art configuration of multiple processors accessing dual ported DASDs through a dynamically managed RAM cache and a non-volatile store (NVS).

Referring now to FIG. 1, there is shown a cache oriented DASD storage subsystem. As depicted, CPU's 1 and 3 each access both internal storage within their respective bounds (not shown) and external storage 6 over respective paths 5 and 7 or 9 and 11. For completeness, it should be noted that internal storage includes processor storage and expanded storage. In this regard, processor store operates on a byte addressable random access while the expanded store operates on a file/record/page addressable random access basis.

External storage 6 comprises one or more DASD accessed through data and control paths including storage control units 13 or 15, DASD subsystem cache 20, and attachment and sequence controller logic 27 and 41 or 31 and 39. Storage subsystem 6 stores the file/record/page of the information referenced by applications executing on either CPU 1 or CPU 2.

In such systems, write requests are accepted from the host processor 1 or 3, keeping two copies of write information in cache RAM 21 and nonvolatile buffer 22 respectively, signaling the host that a write operation was complete as soon as the cache and nonvolatile storage was updated successfully and writing the information to one of the DASDs 43, 45, 47, or 49 later. A copy of the contents for each WRITE reference to cache is kept in NVS until it is written out from cache to DASD during the normal course of events. If a fault occurs, the NVS copy can be made available to the DASD in the manner described in the aforementioned Beardsley patent, Easton et al, U.S. Pat. No. 4,603,380, "DASD Cache Block Staging", issued Jul. 29, 1986, or the copending Courtney application.

System Managed Storage

System managed storage refers to a set of facilities in an operating system such as the IBM MVS DFP 3.2 which undertake to automatically access, classify, maintain, backup and recover, archive, and duplicate information in storage for an information handling system. This set of facilities is configured and maintained by a control construct termed a "subsystem administrator". The configuration is subject to global parameters and policies externally and internally specified to the administrator at time of installation with periodic modification.

With respect to storage subsystem cache management, the IBM MVS/DFP 3.2 operating system can rank order all data sets by hit ratio. As with many near infinite populations, the law of large numbers takes holds meaning that an attribute would assume a normal or Gaussian frequency distribution. The data sets with the smallest hit ratio's can be designated as volumes which are NEVER cached. Similarly, those data sets with the highest ratio's MUST always be cached. Assuming a normal distribution, this means that almost 70% of the data sets having a hit ratio within plus or minus one standard deviation of the mean and would be assigned to the MAY cache category. Realistically, the partitioning the data sets into three categories is somewhat arbitrary.

It should be evident that for purposes of achieving cache optimality, the larger the MAY cache category the better utilization. The remaining description will concern itself over tuning the cache and the NVS usage to data sets which in any given case may be included or inhibited from cache.

Aspects of Monitoring I/O References

As mentioned, the DSHR is the measure of benefit for the caching of a data set. The method and means of this invention maintain two indicators—one (DSHR) for all I/O's (READs+WRITEs)—one (DSHRW) for WRITEs.

To make the system stable, the value of the DSHR's will change only after a period of I/O activity has been monitored. The duration of this period depends on the I/O rate to any given data set. For a higher I/O rate the DSHR and DSHRW values change more often.

Some systems maintain a status bit in the control block associated with each data set indicative as to whether an I/O reference was a hit or miss. In the preferred embodiment using demand/response protocols, a "hit" or "miss" is ascertained as a function of channel disconnect time. A short time i.e. less than 512 microseconds connotes a "hit" or residence of the accessed data in cache. A long time connotes a miss. It should be recalled that channels and other paths disconnect in aid of increasing concurrency or path utilization. Systems use a construct in this case termed a "channel measurement block" for which disconnect time is automatically measured.

The HIT RATIO is calculated as the number of hits divided by the number of I/O's. To avoid abrupt perturbations, the system uses a moving average of the hit ratio formed by averaging the most recent value with the previous value of the mean.

Data Set States and Transitions Caused by Events and Hit Ratio Changes

Central to the dynamic cache management and self tuning of this invention is the notion of data set states. Three states are involved for each type of operation. These are:

| | |
|---|---|
| NORMAL | caching is enabled for the data set - either basic caching or DASD Fast Write. |
| INHIBIT | caching is disabled for the data set - either basic caching or DASD Fast Write. |
| FORCE | caching is enabled for the data set in order to obtain hit ratio statistics otherwise not available. This state is used for each NEWLY opened data set AND for a data set that has been in the INHIBIT state. |

Figure 4:
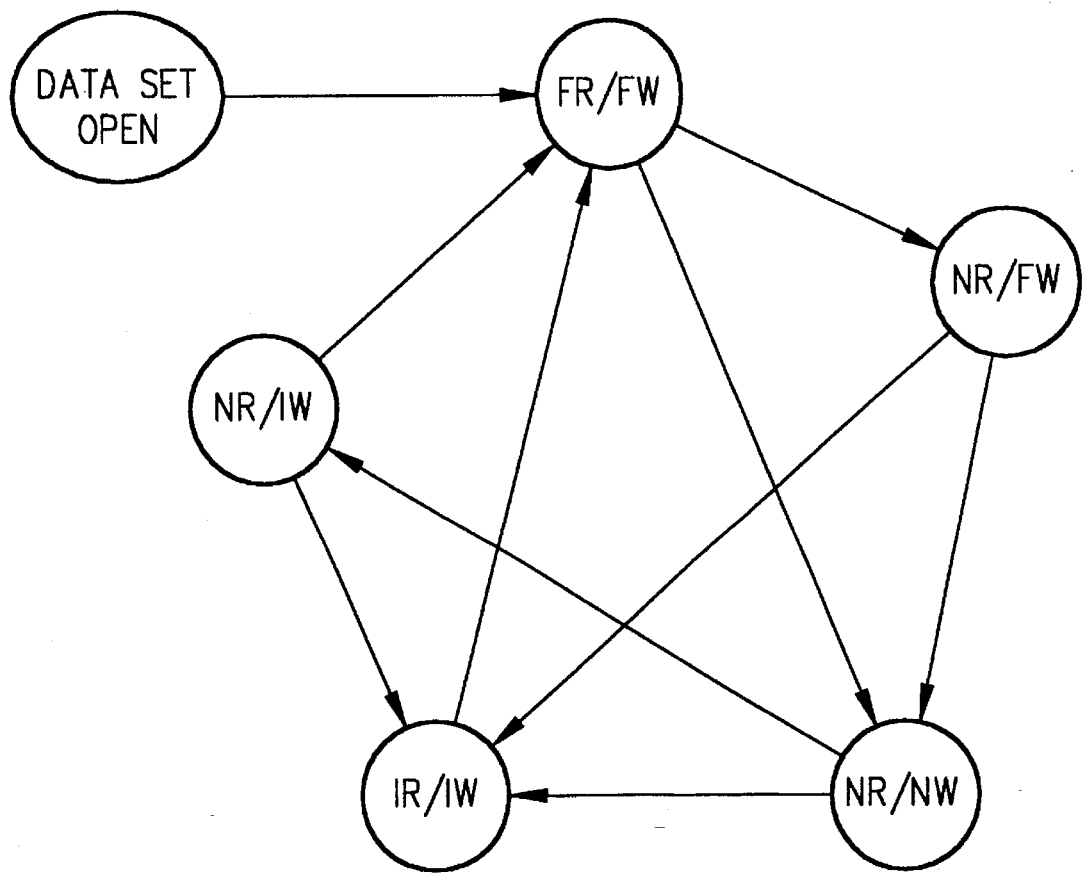

Referring now to FIG. 4, there is a state to state transition diagram and an associated table of valid READ and WRITE states. The transition diagram is a directed graph defined as follows:

| | |
|---|---|
| NR/NW | NORMAL READ, NORMAL WRITE |
| NR/IW | NORMAL READ, INHIBIT WRITE |
| NR/FW | NORMAL READ, FORCE WRITE |
| IR/IW | INHIBIT READ, INHIBIT WRITE |
| FR/FW | FORCE READ, FORCE WRITE |

The directed graph transitions in FIG. 4 are:

| TRANSITION | DESCRIPTION |
|---|---|
| FR/FW → NR/FW | Following re-evaluation, DSHR > ST |
| FR/FW → MR/NW | Following re-evaluation, all I/O's were WRITEs and DSHR > ST |
| NR/FW → NR/NW | After monitoring, DSHRW > WT |
| NR/FW → IR/IW | After monitoring, DSHR < ST |
| NR/NW → IR/IW | After monitoring, DSHR < ST |
| NR/NW → NR/IW | After monitoring, DSHRW < WT |
| IR/IW → FR/FW | INHIBIT completed, switch data set to FORCE state for re-evaluation |
| NR/IW → IR/IW | After monitoring, DSHR < ST |
| NR/IW → FR/FW | INHIBIT completed, switch data set to FORCE state for re-evaluation. |

Referring again to FIG. 4, suppose a data set is opened over which a mixture of READ and WRITE accesses (I/O references) are performed. Initially, the data set starts in the FR/FW state where it will remain for M total I/O references. After M I/O's, the data set will transit into the NR/FW state. Finally, after M WRITEs, the data set will transit into the NR/NW state.

In the event that DSHRW drops, this causes the data set to enter the NR/IW state where it will remain for N WRITE I/O references. From the NR/IW state the data set cannot transit into the NR/FW state, rather, it will enter the FR/FW state where both READs and WRITEs will be forced into the cache.

If while a data set resides in the NR/IW state, DSHR falls below ST, then the data set enters the IR/IW state. In this latter state both READs and WRITEs to that data set will be EXCLUDED from using cache. After N total I/O references, the data set will then transit back to its original state of FR/FW.

Self-Tuned Cache Management

Figure 3:
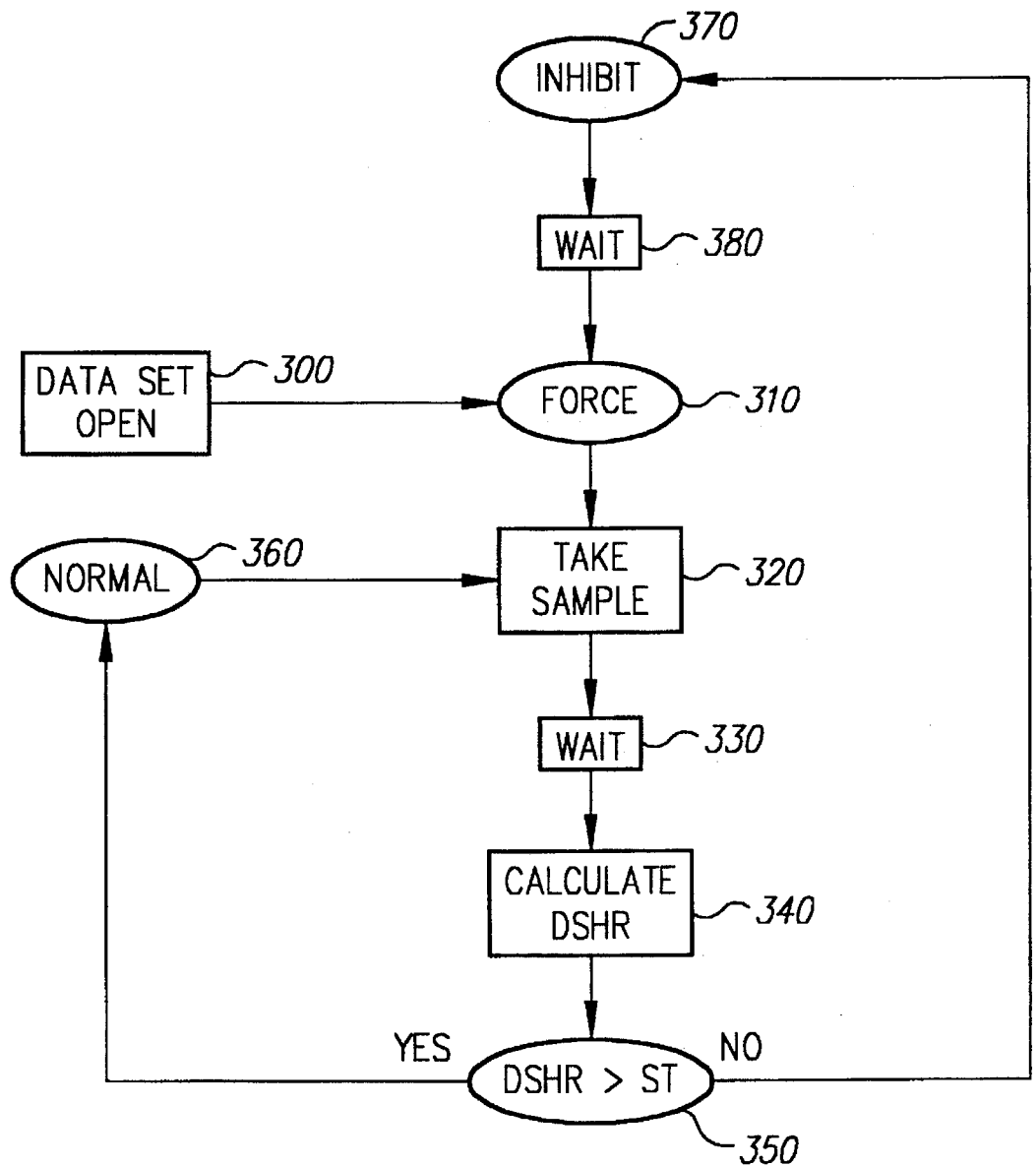
FIGS. 3 and 4 depict state transitions in the dynamic cache management method and means from a flow of control and state to state transition context respectively according to the principles of this invention.

Referring now to FIG. 3, the flow of control of the cache and data set state transitions are depicted. Initially a data set (newly opened data set (block 300) or a data set that has been in the INHIBIT state (block 370) is placed in the force state (block 310). A data set remains in the force state for a given number M of I/Os. This allows the system to derive a hit ratio for the data set (blocks 320, 330, and 340).

After a given number of M I/Os to the data set, the data set is placed in the NORMAL (block 360) state if data set's DSHR>ST. In the normal state, as long as the hit ratio remains above some threshold ST, the caching for the data set is enabled. If the hit ratio falls below ST, the data set is placed in the INHIBIT state (block 380).

The data set remains in the INHIBIT state for a given number N of I/Os (block 380). Even if the threshold ST drops such that the data set's hit ratio is now above ST, the data set is not cached. This provides a degree of stability by preventing frequent state changes, if ST tends to fluctuate. By inhibiting data sets for some number N of I/Os, rather than some fixed period of time, caching is not resumed for all data sets simultaneously. This avoids drastic fluctuations in cache demand. Data sets with higher I/O rates will also re-enter the cache more quickly. These data sets tend to get the highest hit ratios, all other factors being equal.

After a given number N of I/Os to the data set in the INHIBIT state, the data set is placed back in the FORCE state, so that a new hit ratio can be derived. As is done initially, the data set remains in the FORCE state for a given number M of I/Os, after which it is placed back in the NORMAL state.

Self Tuned Dynamic LRU Cache Management, Fast Write, and Non-Volatile Storage

In the prior art it is known that some DASD subsystems support the caching of WRITEs through the use of non-volatile storage (NVS). Where NVS is smaller than basic cache and is managed differently within the subsystem, then different dynamics result for caching READs versus WRITEs. In this invention, the method and means described above are applied separately to WRITEs, which provides for effective use of NVS as well as the basic subsystem cache.

The data set "states" defined above must be modified to accommodate both the read and write characteristics. If the READs are excluded from cache, then the WRITEs are excluded from NVS. If the READs are forced to cache, then the WRITEs are forced to NVS. However, if the data set is in the "normal read" state, then the write state could be in any one of three possible states—normal, inhibit, or force.

Figure 2:
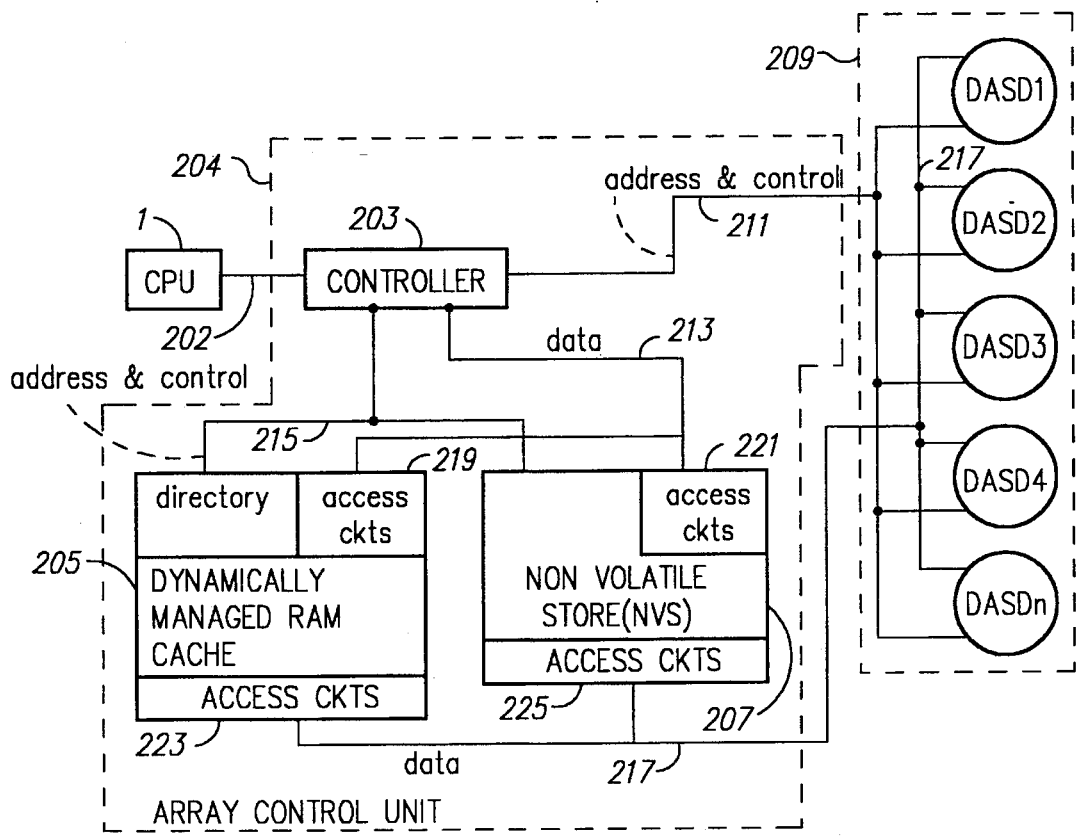
FIG. 2 illustrates a prior art data cache oriented DASD array architecture supportive of self-tuning dynamic cache management and fast write.

Referring now to FIG. 2, there is shown a CPU 1 accessing a DASD array control unit 204 over a path 202. Typically, such paths are demand/response or polling interfaces in which the host expresses access requests in a high level access or channel command language which is interpreted by a control unit (CU) 203. The CU accesses the directory of cache 205 over control path 215 and data path 213 to ascertain whether a dataset or portion thereof is cache resident. If the data set or portion thereof is not resident, then another data set or portion thereof may be destaged to the DASD array (DASD1, . . . , DASDn) over control path 211 and data path 217 following the method and means of the invention.

As has been expressed before, NVS 22 is used with DASD Fast Write as an extension of dynamic self-tuned cache management. In this regard, the subsystem maintains a write threshold (WT) for write operations as well as an overall hit ratio threshold ST. Thus, for each data set, both the overall hit ratio DSHR and the write hit ratio DSHRW are determined. Relatedly, READ I/O are allowed to cache if DSHR>ST and WRITE I/O's invoke DASD Fast Write if DSHRW>WT.

In managing DASD Fast Write and NVS, three write states are used analogous to the NORMAL, INHIBIT, and FORCE states defining each cache involved data set. Now, consider a typical update transaction in which an application on CPU 1 READs a record, updates it in CPU 1 main memory (not shown), and immediately WRITEs the record to external storage 6. If the READ I/O's are cached, the WRITE I/O's are guaranteed to have a WRITE hit registered. If the READ I/O's are not cached, then the WRITE I/O's will likely incur a WRITE miss. From this is inferred the rule that A DATA SET USING NVS SHOULD NEVER BE EXCLUDED FROM CACHE EVEN IF ITS READ HIT RATIO IS 0% and ST<50%. Note, if a data set application consists only of write update references, and if the READ hit ratio is 0% and the WRITE hit ratio is 100%, then the DSHR is 50%. Thus, optimality in managing cache and NVS where data sets are competing is to treat each WRITE update application on a par with READ-only applications that have a 50% hit ratio.

These and other extensions of the invention may be made without departing from the spirit and scope thereof as recited in the appended claims.

We claim:

1. A method for self tuning a least recently used (LRU) disciplined cache in the data path between a storage subsystem and a processor, said processor generating input/output accesses (I/O) referencing cacheable units of data stored in said storage subsystem, comprising the steps by said storage subsystem of:

(a) calculating a threshold value as a function of I/O references generated by said processor to all cacheable units of data;

(b) responsive to an initial processor reference to a cacheable unit of data allowing said unit of data access to cache for M I/O references, and determining a hit ratio of said unit of data;

(c) periodically calculating a hit ratio (hits/(hits+misses)) of the unit of data in step (b) and allowing said unit of data access to cache so long as its hit ratio is greater than the threshold value; and (d) upon a condition that the hit ratio of a unit of data in step (c) becomes less than the threshold value, inhibiting use of the cache by said unit of data for the following N I/O operations after which said unit of data becomes eligible for caching, where the magnitude of M is very much less than the magnitude of N.

2. A method for dynamically managing cacheable units of data in a least recently used (LRU) disciplined cache, said cache attached to a direct access storage device (DASD) external store responsive to a source of external access commands, said cache being in a data path between said external store and the source of said external access commands, presence in cache of a unit of data referenced by an external access command being termed a "hit" and a unit of data's absence a "miss", a "hit ratio" being a function of the ratio of the number of hits to the number of hits plus the number of misses, comprising the steps by said storage subsystem of:

(a) calculating a global threshold (ST) as a function of hit ratios taken over a large sample of data sets and a write threshold (WT) as a function of WRITE hit ratios taken over a large sample of data sets;

(b) responsive to an external access command, initially staging elements of a data set to cache for a fixed number M of access commands to determine the hit ratio of said data set (DSHR), periodically determining said data set's DSHR, and allowing said data set access to cache only where DSHR is greater than ST;

(c) upon DSHR being less than ST, inhibiting all references to said data set by the external access commands from accessing said cache for a period defined by N access commands generally, after which said data set again becomes eligible for caching, the magnitude of M being very much less than the magnitude of N.

3. The method according to claims 1 or 2, wherein a data set is a cacheable unit of data exhibiting homogeneous locality of referencing.

4. A method for dynamically managing a least recently used (LRU) disciplined data set cache intercoupling an external direct access storage device (DASD) storage subsystem to at least one central processing unit (CPU), said CPU executing input/output (I/O) operations (read and write references) over said storage subsystem, references to data sets retained in the cache being denominated a "hit", a data set being an addressable and logical association of files, records, or blocks usually spanning more than a single DASD track up to and including one or more DASD volumes, comprising the steps by said storage subsystem of:

(a) responsive to an initial CPU reference to a data set, assigning said data set to a first category (force state), allowing said data set use of the cache for M I/O operations, and determining a data set hit ratio (DSHR);

(b) for DSHR greater than a subsystem threshold (ST), continuing use of the cache by said data set of step (a), assigning said data set to a second category (normal state), periodically calculating the DSHR of said data set, and continuing further use of said cache by said data set as long as said data set's DSHR is greater than said ST; and (c) for DSHR less than said ST, assigning said data set of step (b) to a third category (inhibit state), inhibiting use of said cache by said data set for the following N I/O operations after which said data set becomes eligible for caching.

5. The method according to claim 4, wherein the substep of periodically calculating the DSHR for each data set in step (b) includes:

monitoring I/O operations to each data set for a period where duration of said period depends on the number of I/O operations to each data set, and forming a value for each DSHR as a function of the moving average of said sampled values.

6. In a subsystem comprising a plurality of direct access storage devices (DASDs) for storing cacheable units of data, a least recently used (LRU) disciplined cache storing a directory, and a control unit for defining a path to units of data either in DASD or in the cache, said control unit responsive to an external source of access commands, wherein said subsystem further comprises:

(a) means responsive to said external source of access commands for reading one or more cacheable units of data from said cache, and for writing one or units of data into the cache;

(b) means for ascertaining an overall (ST) threshold value as a function of the number of the access commands from the source across a large sample of units of data;

(c) means responsive to an initial access command to a cacheable unit of data, for allowing said unit of data access to said cache over M access commands, and for determining an overall hit ratio (DSHR) of said unit of data;

(d) means for periodically determining the hit ratio of the unit of data, for continuing access of said unit of data to the cache so long as said unit of data's DSHR exceeds ST; and (e) means responsive to a condition that DSHR is less than ST for the unit of data, for inhibiting access to the cache by said unit of data for N access commands after which said unit of data becomes eligible again for caching, the magnitude of M being very much less than the magnitude of N.

7. The subsystem according to claim 6, wherein the cacheable unit of data is a data set.

8. A subsystem responsive to access commands from an external source for storage of data sets, comprising:

(a) a plurality of direct access storage devices (DASDs);

(b) a least recently used (LRU) disciplined cache;

(c) a non-volatile store (NVS);

(d) means responsive to said access commands from the external source for reading one or more data sets from said cache, for writing one or more data sets into the cache and a copy of said one or more written data sets into the NVS, and for providing a write completion indication to said external source;

(e) means for calculating an overall subsystem threshold (ST) and a subsystem write threshold (WT) value as a function of the number of the access commands from the external source across a large sample of data sets;

(f) means responsive to an initial access command from the external source to a data set, for allowing access to the cache by said data set for M access commands, and for determining an overall hit ratio (DSHR) and a write hit ratio (DSHRW) of said data set;

(g) means for periodically redetermining the hit ratio of the data set, for continuing access to the cache by said data set so long as said data set's DSHR greater than ST, for retaining said data set in the NVS so long as said data set's DSHRW exceeds WT or until a counterpart resident in cache is written out to ones of said plurality of DASDs, and for writing copies of the data set from NVS to ones of said plurality of DASDs in the event that said data set becomes unavailable from said cache; and (h) means responsive to a condition that DSHR is less than ST for the data set, for inhibiting access to the cache by said data set for N access commands after which said data set becomes eligible for caching, where the magnitude of M is very much less than the magnitude of N.

* * * * *